(12) United States Patent
Balzano et al.

(10) Patent No.: US 9,677,880 B2
(45) Date of Patent: Jun. 13, 2017

(54) LASER ALIGNMENT SYSTEM

(71) Applicant: UNITED TECHNOLOGIES CORPORATION, Farmington, CT (US)

(72) Inventors: Thomas Balzano, Manchester, CT (US); Erik M. Pedersen, Cheshire, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 98 days.

(21) Appl. No.: 14/701,915

(22) Filed: May 1, 2015

(65) Prior Publication Data

US 2016/0320179 A1 Nov. 3, 2016

(51) Int. Cl.
| | |
|---|---|
| *G01B 11/27* | (2006.01) |
| *G01C 15/06* | (2006.01) |
| *G01C 15/00* | (2006.01) |
| *B23K 26/042* | (2014.01) |
| *B24C 3/00* | (2006.01) |

(52) U.S. Cl.
CPC .......... *G01B 11/272* (2013.01); *B23K 26/042* (2015.10); *B24C 3/00* (2013.01); *G01C 15/006* (2013.01)

(58) Field of Classification Search
CPC ... G01B 11/272; G01B 15/006; G01C 15/006
USPC ........................................................ 33/286
See application file for complete search history.

(56) References Cited

U.S. PATENT DOCUMENTS

| | | | | |
|---|---|---|---|---|
| 3,551,057 A | * | 12/1970 | Hamilton | G01B 11/16 250/203.1 |
| 3,901,604 A | * | 8/1975 | Butler | G01B 11/2755 250/237 R |
| 3,951,550 A | * | 4/1976 | Slick | F41G 3/225 356/141.5 |
| 4,653,910 A | * | 3/1987 | Poling | G01C 15/006 33/294 |
| 4,792,228 A | * | 12/1988 | Haffner | B25J 9/1692 356/138 |
| 4,888,890 A | * | 12/1989 | Studebaker | E02F 3/437 33/263 |
| 4,993,160 A | * | 2/1991 | Fraley | G01C 15/02 33/286 |
| 5,302,833 A | | 4/1994 | Hamar et al. | |
| 5,353,111 A | * | 10/1994 | Freese | B24B 5/428 250/214 B |

(Continued)

FOREIGN PATENT DOCUMENTS

| | | |
|---|---|---|
| EP | 0287032 A2 | 10/1988 |
| GB | 2350890 A * | 12/2000 |
| JP | H03106586 A | 5/1991 |

OTHER PUBLICATIONS

European Search Report for application EP 16167567.3, dated Jul. 27, 2016, 8 pages.

*Primary Examiner* — Christopher Fulton
(74) *Attorney, Agent, or Firm* — Cantor Colburn LLP

(57) ABSTRACT

A laser alignment system may comprise a machine, a laser source attached to the machine, a photodiode able to communicate with the laser source, and a receiver including the photodiode, wherein a signal is generated upon communication between the photodiode and the laser source.

20 Claims, 3 Drawing Sheets

(56) References Cited

U.S. PATENT DOCUMENTS

| | | | | |
|---|---|---|---|---|
| 5,402,226 A | * | 3/1995 | Matthews | G01C 15/002 33/285 |
| 5,739,907 A | | 4/1998 | Chen | |
| 6,807,740 B2 | * | 10/2004 | Reed | G01C 15/006 33/286 |
| 7,434,322 B2 | * | 10/2008 | Walser | A63C 19/06 33/286 |
| 7,562,809 B2 | * | 7/2009 | Chua | H05K 1/0269 235/375 |
| 8,006,398 B2 | * | 8/2011 | McFarland | G01B 21/045 33/503 |

* cited by examiner

LASER ALIGNMENT SYSTEM

TECHNICAL FIELD

This disclosure generally relates to alignment and, more particularly, relates to a system for aligning a machine.

BACKGROUND

Machines and tools are commonly used to create or modify parts. A range of industrial processes, including cutting, welding, joining, machining, spraying, casting and many others can refine existing parts or make new parts from stock material. In many applications, for example in the aerospace, energy and defense industries, the precise manufacture and sizing of these parts can be critical to proper and efficient functionality.

To ensure precision during the manufacturing process, a machine or tool must be properly aligned relative to the material, part, machine base or workspace. Such a proper alignment is necessary to ensure that the work being done by the machine occurs at the correct location relative to the part or material. Further, a proper alignment may be checked after a number of events, such as initial machine installation, a given time or number of operations performed, following an adverse incident, following machine servicing or as a part of routine maintenance.

Other approaches to ensuring proper alignment may require complicated and expensive mechanical systems, optical arrangements or sensors. Further, these approaches may be large, immobile or integrated into larger immobile systems.

Accordingly, there is a need for an improved method of aligning a machine.

SUMMARY OF THE DISCLOSURE

To meet the needs described above, the present disclosure provides a laser alignment system that may include a machine, a laser source attached to the machine, a photodiode able to communicate with the laser source, and a receiver including the photodiode, wherein a signal is generated upon communication between the photodiode and the laser source.

The laser source and the photodiode may communicate using a laser signal originating from the laser source, and the signal may cause an indicator to emit an indication. The receiver may include a controller in electrical communication with the photodiode, wherein the controller may produce the signal upon communication between the photodiode and the laser source. The controller may include a memory and a processor, and the memory may include a positioning model. The receiver may include a plurality of photodiodes, each of the plurality of photodiodes being oriented in a different direction and able to communicate with the laser source, wherein the receiver includes a controller in electrical communication with each photodiode, and wherein the controller may produce a signal corresponding to each photodiode upon communication between each of the photodiodes and the laser source.

The receiver may include four photodiodes. Further, the machine may be a robot, and the robot may be a robotic arm or a 6-axis robot. The machine may include a nozzle adapted to eject a substance, and the substance may be an abrasive media or a heated substance.

The present disclosure also provides a machine that may include a laser source attached to the machine, a photodiode able to communicate with the laser source, and a receiver including the photodiode, wherein a signal is generated upon communication between the photodiode and the laser source, and wherein the laser source and the photodiode communicate using a laser signal originating from the laser source.

The receiver may include a controller in electrical communication with the photodiode, the controller may include a memory and a processor, the memory may include a positioning model, and the controller may produce the signal upon communication between the photodiode and the laser source.

Additionally, the receiver may include a plurality of photodiodes, each of the plurality of photodiodes being oriented in a different direction and able to communicate with the laser source, and wherein the receiver may include a controller in electrical communication with each photodiode, and wherein the controller may produce a signal corresponding to each photodiode upon communication between each of the photodiodes and the laser source. The machine may be a 6-axis robot and the machine may include a nozzle adapted to eject a substance. The substance may be an abrasive media.

The present disclosure further provides a method of aligning a machine that may include attaching a laser source to the machine, emitting a laser signal from the laser source, attaching a photodiode to a receiver, receiving the laser signal with the photodiode, and producing a signal upon the photodiode receiving the laser signal from the laser source, wherein the receiver includes a controller in electrical communication with the photodiode, the controller including a memory and a processor and the memory including a positioning model, and wherein the controller produces the signal upon the photodiode receiving the laser signal from the laser source.

The receiver may include a plurality of photodiodes, each of the plurality of photodiodes being oriented in a different direction and able to communicate with the laser source, wherein the receiver may include a controller in electrical communication with each photodiode, and wherein the controller may produce a signal corresponding to each photodiode upon communication between each of the photodiodes and the laser source.

These, and other aspects and features of the present disclosure, will be better understood upon reading the following detailed description when taken in conjunction with the accompanying drawings.

BRIEF DESCRIPTION OF THE DRAWINGS

For further understanding of the disclosed concepts and embodiments, reference may be made to the following detailed description, read in connection with the drawings, wherein like elements are numbered alike, and in which.

It is to be noted that the appended drawings illustrate only typical embodiments and are therefore not to be considered limiting with respect to the scope of the disclosure or claims. Rather, the concepts of the present disclosure may apply within other equally effective embodiments. Moreover, the drawings are not necessarily to scale, emphasis generally being placed upon illustrating the principles of certain embodiments.

DETAILED DESCRIPTION

Figure 1:
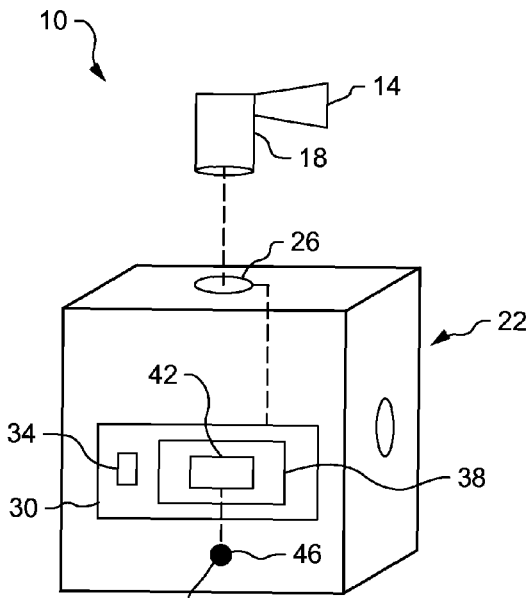
FIG. 1 is a perspective view of a laser system constructed in accordance with the present disclosure.

Turning now to the drawings, and with specific reference to FIG. 1, a laser alignment system constructed in accordance with the present disclosure is generally referred to by reference numeral 10. The laser alignment system 10 is shown to include a machine 14, laser source 18 and a receiver 22. Although shown as a largely cubic object, the receiver 22 can be of any shape. Alternatively, the receiver 22 could instead be an arrangement of components that may or may not all be attached to a single object.

The laser source 18 may be capable of emitting a signal, which may be a laser signal. The laser signal may be any color and may include constant or pulsed laser communications. Further, the laser source 18 may be attached to, or mounted on, the machine 14. A photodiode 26 may also be included, and may be attached to, or integrated with, the receiver 22.

The laser alignment system 10 may also include a controller 30, which may be attached to, or integrated with, the receiver 22. In turn, the controller 30 may include a processor 34 and a memory 38. The controller 30 may be in electrical communication with the photodiode 26. The memory 38 may also include a positioning model 42. The laser alignment system 10 may further include an indicator 46. The indicator 46 may be located on the receiver 22 as shown, or located elsewhere, and may be in electrical communication with the controller 30. The indicator 46 may be a light 50, a sound-emitting device or any other type of indicator.

In operation, the laser source 18 is attached to, or mounted on, the machine 14, and a communication is emitted from the laser source 18. The communication may be a laser signal. The relative orientations of the laser source 18 and machine 14 are known, such that a given laser signal emitted from the laser source 18 corresponds to a given machine 14 orientation. If the communication is received by the photodiode 26, a photodiode signal may be sent from the photodiode 26 to the controller 30 indicating the communication was received. A communication received from the laser source 18 by the photodiode 26 may indicate a proper machine 14 alignment.

Upon receiving the photodiode signal, the controller 30 may process the information using algorithms stored in the memory 38, specifically stored within the positioning model 42. The positioning model 42 may include one or more algorithms designed to interpret photodiode 26 information and generate corresponding indicator signals. Accordingly, the controller 30 may, based on the photodiode signal, generate an indicator signal. The indicator signal may be sent from the controller 30 to the indicator 46. In turn, the indicator 46 may produce an indication, which may be a visible light, audible noise, electronic signal or other indication. In this manner, the laser alignment system 10 can selectively generate an indication based upon the photodiode's 26 receipt of a communication from the laser source 18.

Figure 2:
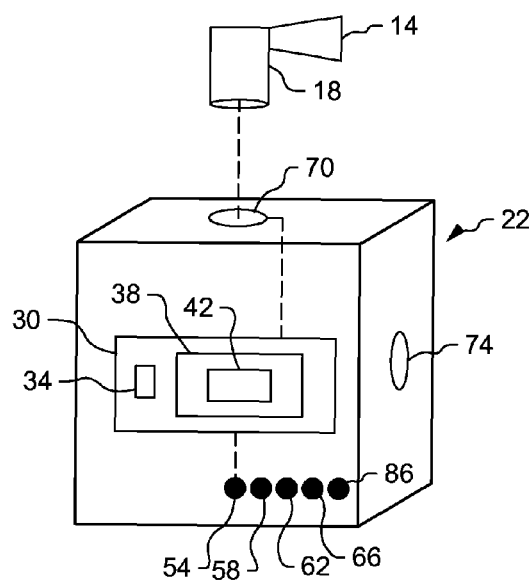
FIG. 2 is a perspective view of another embodiment of the laser system of FIG. 1 constructed in accordance with the present disclosure.
Figure 3:
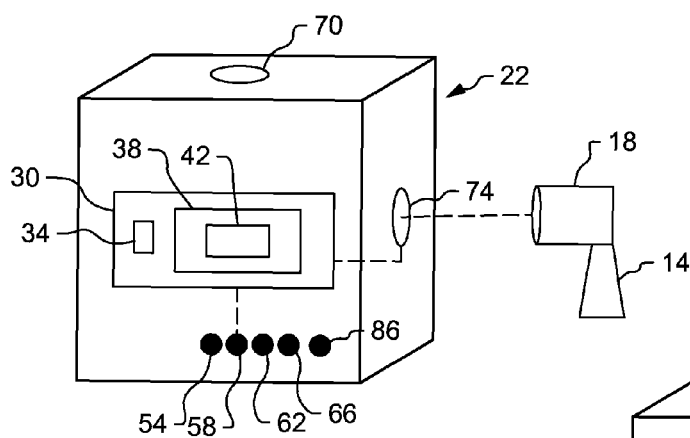
FIG. 3 is a perspective view of the embodiment of FIG. 2, shown with a different arrangement than that of FIG. 2, constructed in accordance with the present disclosure.
Figure 4:
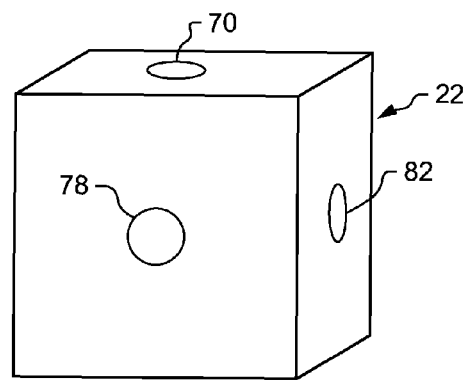
FIG. 4 is a perspective view of the laser system of FIG. 2 showing a different perspective than that of FIG. 2, constructed in accordance with the present disclosure.

Another embodiment of the laser alignment system 10 is shown in FIGS. 2-4. As in the embodiment shown in FIG. 1, the embodiment shown in FIGS. 2-4 includes the machine 14, laser source 18, receiver 22, controller 30, processor 34 and memory 38. However, the current embodiment differs from that shown in FIG. 1 in that it includes first 54, second 58, third 62 and fourth 66 indicators. Additionally, the current embodiment includes first 70, second 74, third 78 and fourth 82 photodiodes. The controller 30 may be in electrical communication with each photodiode 70, 74, 78, 82 and with each indicator 54, 58, 62, 66. Although shown with four of each, it can be understood that embodiments having more or fewer than four photodiodes 70, 74, 78, 82 or indicators 54, 58, 62, 66 are within the scope of this disclosure.

In operation, the embodiment shown in FIGS. 2-4 includes the laser source 18 attached to, or mounted on, the machine 14. A communication is emitted from the laser source 18 and the communication may be a laser signal. The relative orientations of the laser source 18 and machine 14 are known, such that a given laser signal emitted from the laser source 18 corresponds to a given machine 14 orientation. If the communication is received by one of the photodiodes 70, 74, 78, 82, a photodiode signal corresponding to the photodiode 70, 74, 78, 82 receiving the communication may be sent from the appropriate photodiode 70, 74, 78, 82 to the controller 30 indicating the communication was received. A communication received from the laser source 18 by the photodiode 70, 74, 78, 82 may indicate a proper machine 14 alignment.

Upon receiving the photodiode signal, the controller 30 may process the information using algorithms stored in the memory 38, specifically stored within the positioning model 42. The positioning model 42 may include one or more algorithms designed to interpret photodiode 70, 74, 78, 82 information and generate corresponding indicator signals. Accordingly, the controller 30 may, based on the photodiode signal and the photodiode 70, 74, 78, 82 from which it was received, generate an indicator signal. The indicator signal may be sent from the controller 30 to one or more of the indicators 54, 58, 62, 66, which may be located on the receiver 22 or elsewhere. In turn, the one or more indicators 54, 58, 62, 66 may produce an indication, which may be a visible light, audible noise, electronic signal or other indication. In this manner, the laser alignment system 10 can selectively generate one or more indications based upon a photodiode's 70, 74, 78, 82 receipt of a communication from the laser source 18.

The controller 30, using the included positioning model 42, can interpret incoming data in a variety of ways, and generate a range of corresponding output signals. For example, when any one photodiode 70, 74, 78, 82 receives a communication, the controller 30, via photodiode signal and indicator signal, can instruct a single corresponding indicator 54, 58, 62, 66 to generate an indication. Alternatively, the controller 30 could instruct more than one of the indicators 54, 58, 62, 66 to generate an indication.

As shown in FIGS. 2 and 3, the machine 14 and laser source 18 may be positioned at multiple orientations or locations relative to the receiver 22. The different orientations may position the laser source 18 to enable communication with different photodiodes 70, 74, 78, 82. As shown in FIG. 2, communication is made between the laser source 18 and the first photodiode 70, while FIG. 3 shows communication between the laser source 18 and the second photodiode 74. Communication as shown in FIGS. 2 and 3 could occur sequentially, as the machine 14 and laser source 18 communicate with a first photodiode 70 and are then repositioned to allow communication with another photodiode 74. This process can be repeated for all remaining photodiodes 78, 82. Alternatively, the laser alignment system 10 could also have multiple laser sources 18 that allow simultaneous communication with different photodiodes 70, 74, 78, 82.

In this arrangement, the controller 30, using the included positioning model 42, can interpret incoming data in a variety of ways, and generate a range of corresponding output signals. For example, when more than one photodiode 70, 74, 78, 82 receives a communication, the controller 30, via photodiode signal and indicator signal, can instruct a single corresponding indicator 54, 58, 62, 66, or a non-corresponding indicator 86, to generate an indication. Alternatively, the controller 30 could instruct more than one of the indicators 54, 58, 62, 66 to generate an indication.

Figure 5:
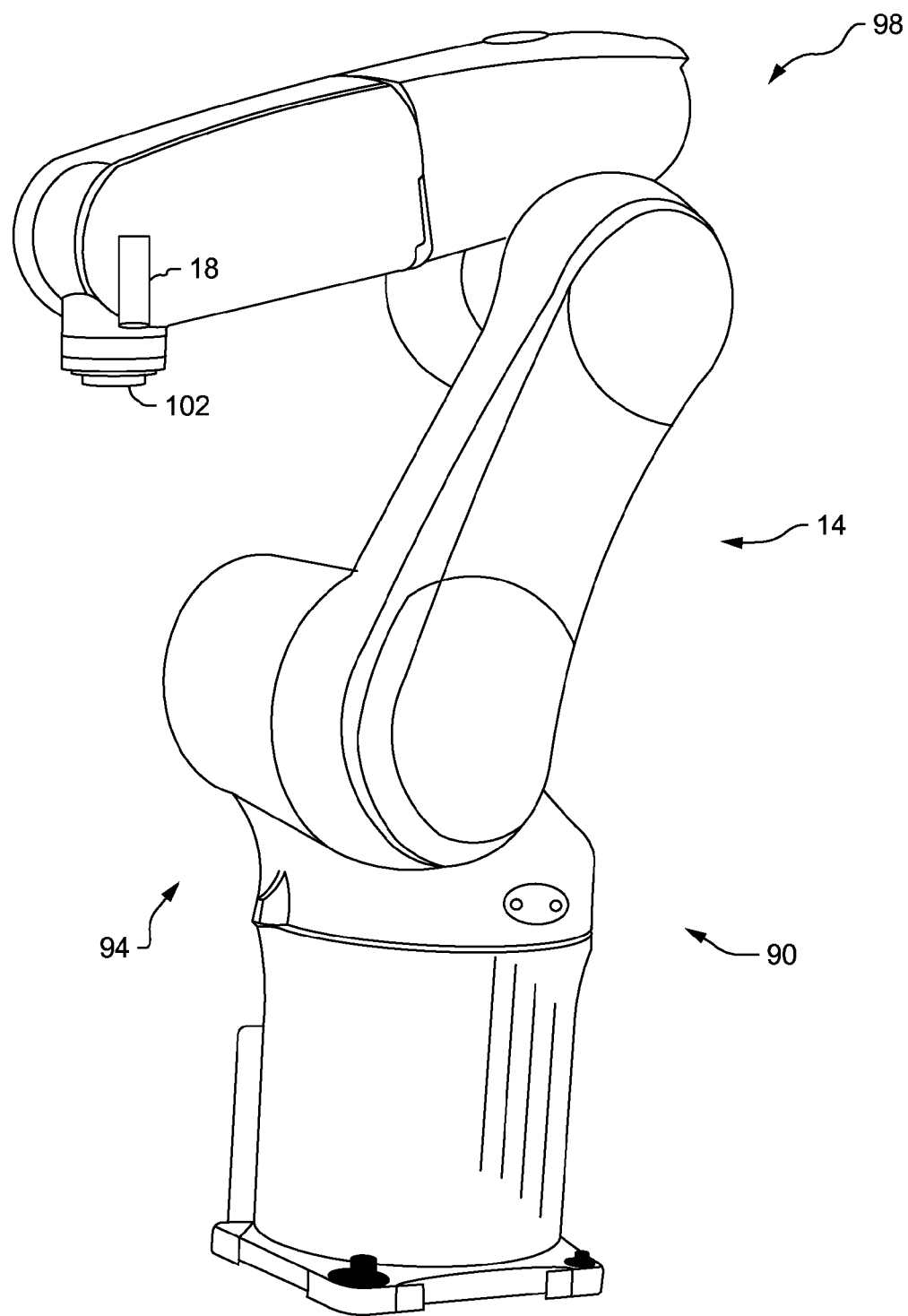
FIG. 5 is a perspective view of a machine constructed in accordance with the present disclosure.

Turning now to FIG. 5, an embodiment of the machine 14 is shown. The machine 14 may be a robot 90 and, more specifically, may be a 6-axis robot 94 or a robotic arm 98. The robot 90, 6-axis robot 94 or robotic arm 98 may be externally controllable by various means and may mount a variety of tools including sprayers, cutting tools, optical tools and additive tools.

The machine 14 may also include a nozzle 102 adapted to eject a substance. The substance may be an abrasive media, used to shape or erode a material, or a heated substance used to coat a material. Additionally, the nozzle 102 may be a plasma sprayer.

The disclosed laser alignment system 10 enables the precise alignment of the machine 14 within a given workspace. This supports accurate production, reduced machine 14 wear and increased operational predictability. Such an alignment can be performed after new machine 14 parts are installed, after initial machine 14 installation or after transitioning between machine 14 tasks.

Figure 6:
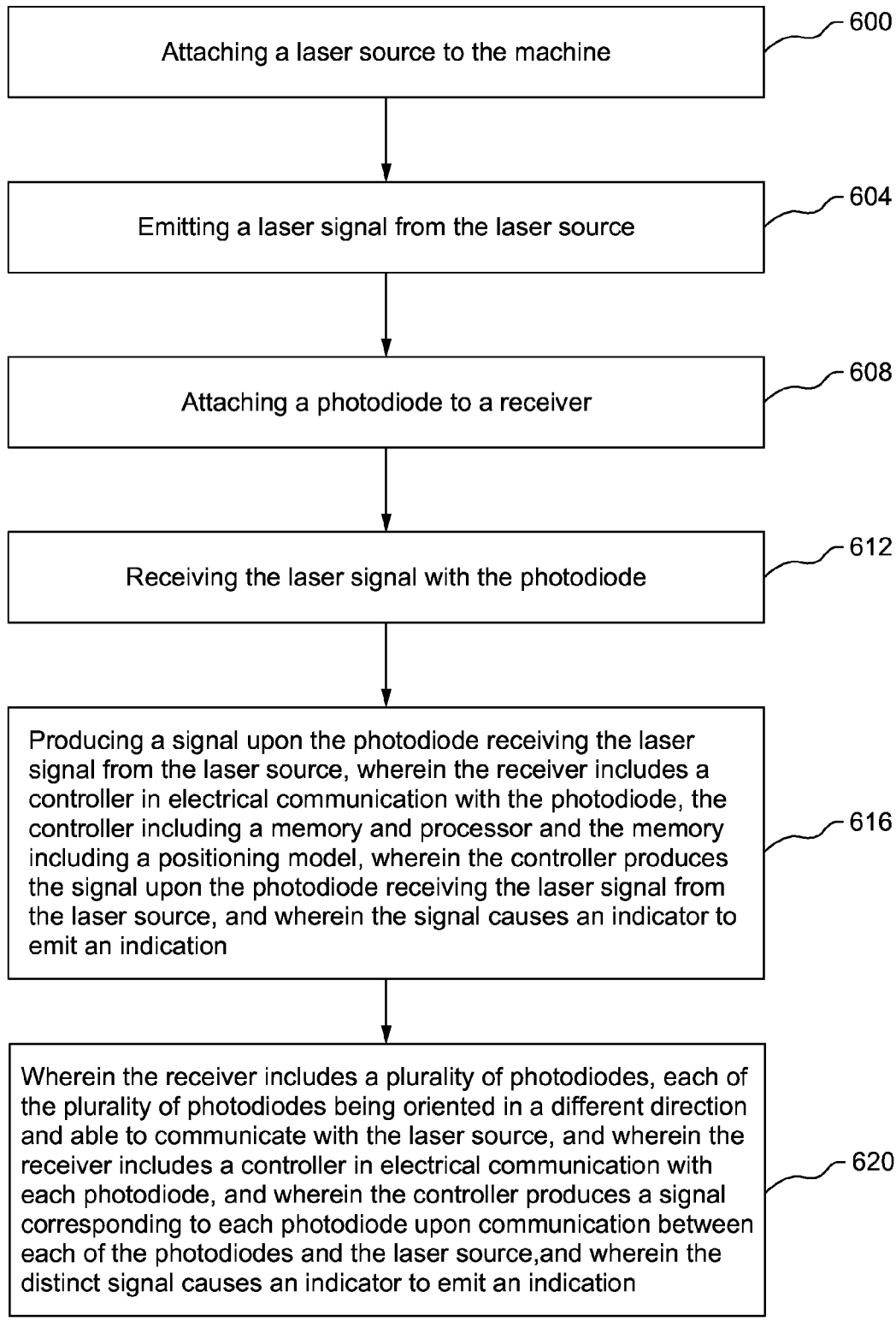
FIG. 6 is a flowchart depicting a sample sequence of steps which may be practiced using the teachings of the present disclosure.

A method for aligning a machine part can best be understood by referencing the flowchart in FIG. 6. The method may comprise attaching a laser source to the machine and emitting a laser signal from the laser source, as shown in steps 600 and 604. The method may also include attaching a photodiode to a receiver and receiving the laser signal with the photodiode, as shown in steps 608 and 612. Additionally, the method may include producing a signal upon the photodiode receiving the laser signal from the laser source, wherein the receiver includes a controller in electrical communication with the photodiode, the controller including a memory and a processor and the memory including a positioning model, wherein the controller produces the signal upon the photodiode receiving the laser signal from the laser source, and wherein the signal causes an indicator to emit an indication, as shown in step 616. Further, the method may include wherein the receiver includes a plurality of photodiodes, each of the plurality of photodiodes being oriented in a different direction and able to communicate with the laser source, wherein the receiver includes a controller in electrical communication with each photodiode, wherein the controller produces a signal corresponding to each photodiode upon communication between each of the photodiodes and the laser source, and wherein the distinct signal causes an indicator to emit an indication, as shown in step 620.

INDUSTRIAL APPLICABILITY

In operation, the present disclosure sets forth a system, machine and method of machine alignment which can find industrial applicability in a variety of settings. For example, the disclosure may be advantageously employed in manufacturing various parts of a gas turbine engine, or other complex systems. However, the disclosure can also find use in any number of processes requiring machine alignment.

The disclosed laser alignment system enables the precise alignment of the machine within a given workspace. This supports accurate production, reduced machine wear and increased operational predictability. Such an alignment can be performed after new machine parts are installed, after initial machine installation or after transitioning between machine tasks. The receiver may also be a portable unit. Additionally, the disclosed method and apparatus may eliminate manual inputs for alignment, increasing production speed and accuracy.

The disclosed laser alignment system may be included with new machines or added as a retrofit to existing machines.

What is claimed is:

1. A laser alignment system, comprising:
a machine having a laser source; and
a receiver having a plurality of photodiodes oriented in different directions and able to communicate with the laser source, wherein a signal is generated upon communication between the photodiode and the laser source, wherein the machine and laser source communicate with a first photodiode and are then repositioned to allow communication with another photodiode until all remaining photodiodes communicate with the laser source.

2. The laser alignment system of claim 1, wherein the laser source and the photodiode communicate using a laser signal originating from the laser source, and wherein the signal causes an indicator to emit an indication.

3. The laser alignment system of claim 1, wherein the receiver includes a controller in electrical communication with the photodiode, and wherein the controller produces the signal upon communication between the photodiode and the laser source.

4. The laser alignment system of claim 3, wherein the controller includes a memory and a processor, and wherein the memory includes a positioning model.

5. The laser alignment system of claim 1, wherein the receiver includes a controller in electrical communication with each photodiode, and wherein the controller produces a signal corresponding to each photodiode upon communication between each of the photodiodes and the laser source.

6. The laser alignment system of claim 5, wherein the receiver includes four photodiodes.

7. The laser alignment system of claim 1, wherein the machine is a robot.

8. The laser alignment system of claim 7, wherein the robot is a robotic arm.

9. The laser alignment system of claim 7, wherein the robot is a 6-axis robot.

10. The laser alignment system of claim 1, wherein the machine includes a nozzle adapted to eject a substance.

11. The laser alignment system of claim 10, wherein the substance is an abrasive media.

12. The laser alignment system of claim 10, wherein the substance is a heated substance.

13. A machine, comprising:
a laser source attached to the machine; and
a receiver having a plurality of photodiodes oriented in different directions and able to communicate with the laser source, wherein a signal is generated upon communication between the photodiode and the laser source, and wherein the laser source and the photodiode communicate using a laser signal originating from the laser source, wherein the machine and laser source communicate with a first photodiode and are then repositioned to allow communication with another photodiode until all remaining photodiodes communicate with the laser source.

14. The machine of claim 13, wherein the receiver includes a controller in electrical communication with the photodiode, wherein the controller includes a memory and a processor, wherein the memory includes a positioning model and the controller produces the signal upon communication between the photodiode and the laser source, and wherein the signal causes an indicator to emit an indication.

15. The machine of claim 13, wherein the receiver includes a controller in electrical communication with each photodiode, and wherein the controller produces a signal corresponding to each photodiode upon communication between each of the photodiodes and the laser source.

16. The machine of claim 13, wherein the machine is a 6-axis robot.

17. The machine of claim 13, wherein the machine includes a nozzle adapted to eject a substance.

18. The machine of claim 17, wherein the substance is an abrasive media.

19. A method of aligning a machine, comprising:
attaching a laser source to the machine;
emitting a laser signal from the laser source;
attaching a plurality of photodiodes oriented in a different directions to a receiver;
positioning the machine and laser source to allow communication with a first photodiode, wherein the laser source and the photodiode communicate using a laser signal originating from the laser source;
receiving the laser signal with the first photodiode; and
producing a signal upon the first photodiode receiving the laser signal from the laser source, wherein the receiver includes a controller in electrical communication with each photodiode, the controller including a memory and a processor and the memory including a positioning model, wherein the controller produces the signal upon each of the photodiodes receiving the laser signal from the laser source, and wherein the signal causes an indicator to emit an indication, wherein the machine and laser source communicate with the first photodiode and are then repositioned to allow communication with another photodiode until all remaining photodiodes communicate with the laser source.

20. The method of claim 19, wherein the receiver includes a controller in electrical communication with each photodiode, wherein the controller produces a signal corresponding to each photodiode upon communication between each of the photodiodes and the laser source, and wherein the distinct signal causes an indicator to emit an indication.

* * * * *